(12) United States Patent
Song et al.

(10) Patent No.: US 10,917,818 B2
(45) Date of Patent: *Feb. 9, 2021

(54) METHOD AND APPARATUS FOR GROUP COMMUNICATION IN WIRELESS COMMUNICATION SYSTEM

(71) Applicant: Samsung Electronics Co., Ltd., Suwon-si (KR)

(72) Inventors: Junhyuk Song, Anyang-si (KR); Daejoong Kim, Yongin-si (KR); Juyoung Kim, Hwaseong-si (KR); Hyungtaig Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,285

(22) Filed: Nov. 22, 2019

(65) Prior Publication Data

US 2020/0092754 A1    Mar. 19, 2020

Related U.S. Application Data

(63) Continuation of application No. 15/141,111, filed on Apr. 28, 2016, now Pat. No. 10,492,103.

(30) Foreign Application Priority Data

Apr. 28, 2015   (KR) .................. 10-2015-0059967
Jun. 4, 2015    (KR) .................. 10-2015-0125860

(51) Int. Cl.
*H04W 28/14*  (2009.01)
*H04L 12/761* (2013.01)
*H04W 4/06*   (2009.01)
*H04W 88/08*  (2009.01)

(52) U.S. Cl.
CPC ............ *H04W 28/14* (2013.01); *H04L 45/16* (2013.01); *H04W 4/06* (2013.01); *H04W 88/08* (2013.01)

(58) Field of Classification Search
None
See application file for complete search history.

(56) References Cited

U.S. PATENT DOCUMENTS

| 5,325,357 A  | 6/1994 | Kimoto et al. |
| 6,567,388 B1 | 5/2003 | Tomcik et al. |
| 7,254,132 B2 | 8/2007 | Takao et al.  |

(Continued)

FOREIGN PATENT DOCUMENTS

| CN | 101163269 A | 4/2008 |
| CN | 101674532 A | 3/2010 |
| CN | 102598561 A | 7/2012 |

(Continued)

OTHER PUBLICATIONS

Chinese Office Action dated Jan. 28, 2019, issued in a counterpart Chinese application No. 201680024740.6.

*Primary Examiner* — Rebecca E Song
(74) *Attorney, Agent, or Firm* — Jefferson IP Law, LLP

(57) ABSTRACT

A method for group communication of a broadcasting server in a wireless communication system is provided. The method for group communication of a broadcasting server includes receiving a data packet from a content server, generating a transmission packet by copying the data packet, and transmitting the generated transmission packet to a base station.

18 Claims, 16 Drawing Sheets

(56) References Cited

U.S. PATENT DOCUMENTS

| | | |
|---|---|---|
| 8,774,048 B2 | 7/2014 | Raveendran |
| 8,977,935 B2 | 3/2015 | Yang et al. |
| 2003/0063591 A1 | 4/2003 | Leung et al. |
| 2004/0117498 A1* | 6/2004 | Hashimoto ........... H04L 69/164 |
| | | 709/230 |
| 2004/0213214 A1 | 10/2004 | Jung et al. |
| 2007/0047574 A1 | 3/2007 | Ling |
| 2007/0047591 A1 | 3/2007 | Senthilnathan et al. |
| 2007/0058595 A1 | 3/2007 | Classon et al. |
| 2008/0008176 A1 | 1/2008 | Lim et al. |
| 2008/0089265 A1 | 4/2008 | Park et al. |
| 2009/0049356 A1 | 2/2009 | Lin |
| 2009/0303913 A1 | 12/2009 | Yu et al. |
| 2009/0319845 A1 | 12/2009 | Liu et al. |
| 2010/0067425 A1 | 3/2010 | Chen et al. |
| 2010/0223533 A1 | 9/2010 | Stockhammer et al. |
| 2010/0260164 A1 | 10/2010 | Moon et al. |
| 2010/0297991 A1 | 11/2010 | Dahlman et al. |
| 2011/0167326 A1* | 7/2011 | Kuri ..................... H04L 1/1671 |
| | | 714/807 |
| 2011/0286412 A1 | 11/2011 | Mochida et al. |
| 2012/0163427 A1 | 6/2012 | Kim |
| 2014/0348055 A1 | 11/2014 | Hoymann et al. |
| 2014/0369249 A1 | 12/2014 | Mikhailov et al. |
| 2016/0308696 A1 | 10/2016 | Nihsimura |
| 2016/0323050 A1 | 11/2016 | Song et al. |
| 2017/0142755 A1 | 5/2017 | Bhargava et al. |

FOREIGN PATENT DOCUMENTS

| | | |
|---|---|---|
| CN | 103814533 A | 5/2014 |
| WO | 03/030460 A2 | 4/2003 |

\* cited by examiner

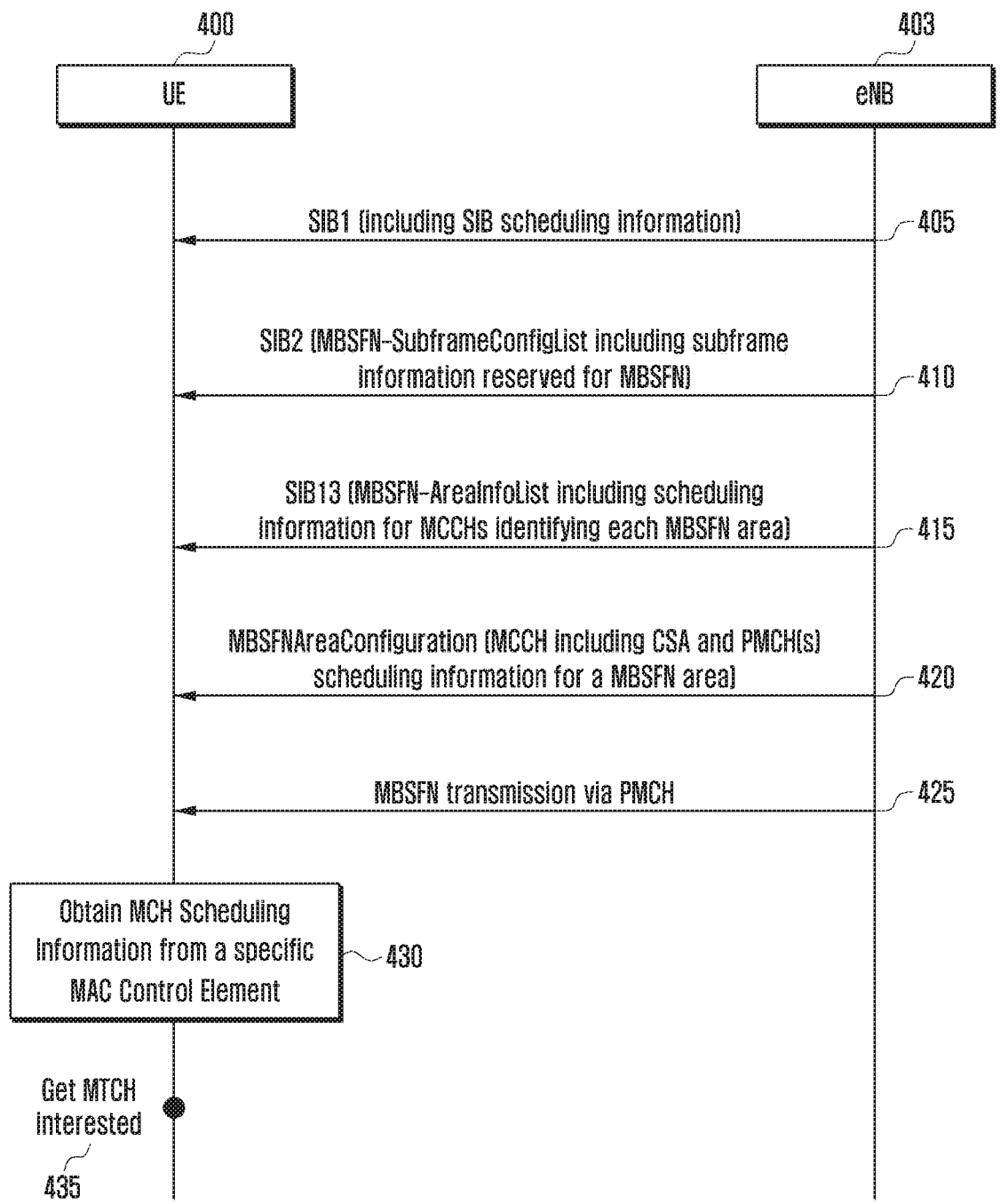

METHOD AND APPARATUS FOR GROUP COMMUNICATION IN WIRELESS COMMUNICATION SYSTEM

CROSS-REFERENCE TO RELATED APPLICATION(S)

This application is a continuation application of prior application Ser. No. 15/141,111, filed on Apr. 28, 2016, which claimed the benefit under 35 U.S.C. § 119(a) of a Korean patent application filed on Apr. 28, 2015 in the Korean Intellectual Property Office and assigned Serial number 10-2015-0059967, and of a Korean patent application filed on Sep. 4, 2015 in the Korean Intellectual Property Office and assigned Serial number 10-2015-0125860, the entire disclosure of each of which is hereby incorporated by reference.

TECHNICAL FIELD

The present disclosure relates to a wireless communication system. More particularly, the present disclosure relates to a method and an apparatus for providing reliability of group communication using a multimedia broadcast multicast service (MBMS) in a long term evolution (LTE) system.

BACKGROUND

Generally, a mobile communication system has been developed to provide a voice service while securing an activity of a user. However, the mobile communication system gradually extends an area from a voice service to a data service. At present, the mobile communication system has been developed to provide a high-speed data service. However, since the existing mobile communication system providing services suffers from a resource shortage phenomenon and users require a higher-speed service, a more developed mobile communication system has been required.

Meanwhile, unlike a voice service, a data service determines resources, and the like, which may be allocated depending on the amount of data to be transmitted and a channel condition. Therefore, in a wireless communication system such as the mobile communication system, a scheduler performs management such as allocating a transmission resource in consideration of the amount of data to be transmitted, the channel condition, the amount of data, and the like. This is identically performed even in long term evolution (LTE) which is one of the next-generation mobile communication systems and the scheduler located in a base station manages and allocates a radio transmission resource.

Recently, discussions about an advanced LTE communication system (LTE-advanced (LTE-A)) which increases a transmission rate by combining various new technologies with the LTE communication system have started in earnest. In the LTE-A system, improvement in multimedia broadcast multicast service (MBMS) is also included. The MBMS (used mixed with evolved MBMS (eMBMS) in the present disclosure) is a broadcasting service provided through the LTE system.

In particular, when a public safety-LTE PS-LTE performs group communication using a unicast method, excessive resources are required. Therefore, a method for group communication using eMBMS is used. However, when a packet transmitted from the eMBMS transmission service used in the public safety-LTE PS-LTE is lost, it is difficult to recover the lost packet. Accordingly, when the public safety-LTE PS-LTE uses the eMBMS to provide the group communication service, discussions about a method for securing reliability of group communication are required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for recovering lost data to secure reliability of group communication when a long term evolution (LTE) system uses a multimedia broadcast multicast service (MBMS) to provide a group communication system.

In accordance with an aspect of the present disclosure, a method for group communication of a broadcasting server in a wireless communication server is provided. The method includes receiving a data packet from a content server, generating a transmission packet by copying the data packet, and transmitting the generated transmission packet to a base station.

In accordance with an aspect of the present disclosure, a method for group communication of a base station in a wireless communication system is provided. The method includes receiving a transmission packet generated in a broadcasting server from the broadcasting server, storing the received transmission packet in a buffer, and transmitting the stored transmission packet to a terminal through at least two subframes.

In accordance with an aspect of the present disclosure, a broadcasting server in a wireless communication system is provided. The broadcasting server includes a transceiver configured to perform communication with other network entities, and a processor configured to receive a data packet from a content server, generate a transmission packet by copying the data packet, and transmit the generated transmission packet to a base station.

In accordance with an aspect of the present disclosure a base station in a wireless communication system is provided. The base station includes a transceiver configured to perform communication with other network entities, and a processor configured to receive a transmission packet generated in a broadcasting server from the broadcasting server, store the received transmission packet in a buffer, and transmit the stored transmission packet to a terminal through at least two subframes.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a flow chart illustrating a process of receiving, by a terminal, MBSFN, according to various embodiments of the present disclosure;

Throughout the drawings, like reference numerals will be understood to refer to like parts, components, and structures.

DETAILED DESCRIPTION

Figure 1:
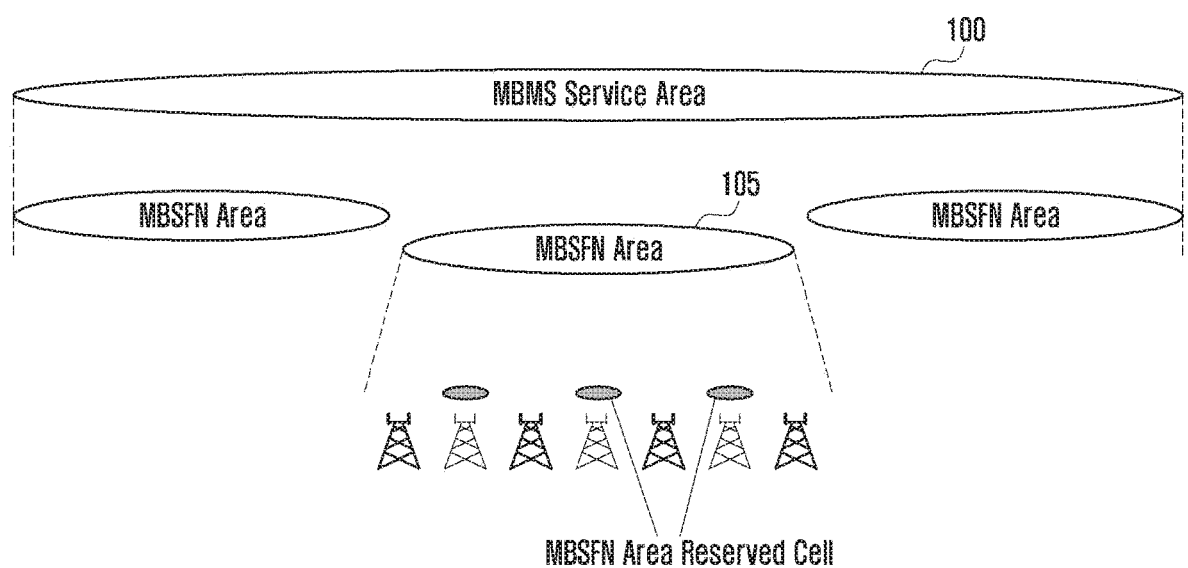
FIG. 1 is a diagram of multimedia broadcast multicast service (MBMS) according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some components are exaggerated, omitted, or schematically illustrated in the accompanying drawings. Further, the size of each component does not exactly reflect its real size. In each drawing, the same or corresponding components are denoted by the same reference numerals.

In this case, it may be understood that each block of processing flow charts and combinations of the flow charts may be performed by computer program instructions. Since these computer program instructions may be mounted in a processor of a general computer, a special computer, or other programmable data processing apparatuses, these computer program instructions executed through the process of the computer or the other programmable data processing apparatuses create means performing functions described in block(s) of the flow chart. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in the block(s) of the flow chart. Since the computer program instructions may also be mounted on the computer or the other programmable data processing apparatuses, the instructions performing a series of operations on the computer or the other programmable data processing apparatuses to create processes executed by the computer, thereby executing the computer or the other programmable data processing apparatuses may also provide operations for performing the functions described in block(s) of the flow chart.

In addition, each block may indicate some of modules, segments, or codes including one or more executable instructions for executing a specified logical function(s). Further, it is to be noted that functions mentioned in the blocks occur regardless of a sequence in some alternative embodiments. For example, two blocks that are continuously shown may be simultaneously performed in fact or be performed in a reverse sequence depending on corresponding functions.

Here, the term '-unit' used in the present embodiment means software or hardware components such as field programmable gate array (FPGA) and application-specific integrated circuit (ASIC) and the '~unit' performs any roles. However, the meaning of the '~unit' is not limited to software or hardware. The '~unit' may be configured to be in a storage medium that may be addressed and may also be configured to reproduce one or more processor. Therefore, as an example, '~unit' includes components such as software components, object oriented software components, class components, and task components, processes, functions, attributes, procedures, subroutines, segments of a program code, drivers, firmware, a microcode, a circuit, data, database, data structures, tables, arrays, and variables. The functions provided in the components and the 'units' may be combined with a smaller number of components and the 'units' or may further separated into additional components and 'units'. In addition, the components and the 'units' may also be implemented to reproduce one or more central processing unit (CPUs) within a device or a security multimedia card.

FIG. 1 is a conceptual diagram of multimedia broadcast multicast service MBMS according to an embodiment of the present disclosure.

An MBMS service area 100 is a network area configured of a plurality of base stations which may perform a multimedia broadcast multicast service single frequency network (MBSFN) transmission.

An MBSFN area 105 (or broadcasting area information, hereinafter, two terms may be used mixed with each other) is a network area configured of integrated several cells for the MBSFN transmission and in all the cells within the MBSFN area the MBSFN transmission is synchronized.

All the cells other than MBSFN area reserved cells 110 are used for the MBSFN transmission. The MBSFN area reserved cell 110 is a cell not used for the MBSFN transmission and can be used for transmission for other purposes, but limited transmission power may be permitted for radio resources allocated for the MBSFN transmission.

Figure 2:
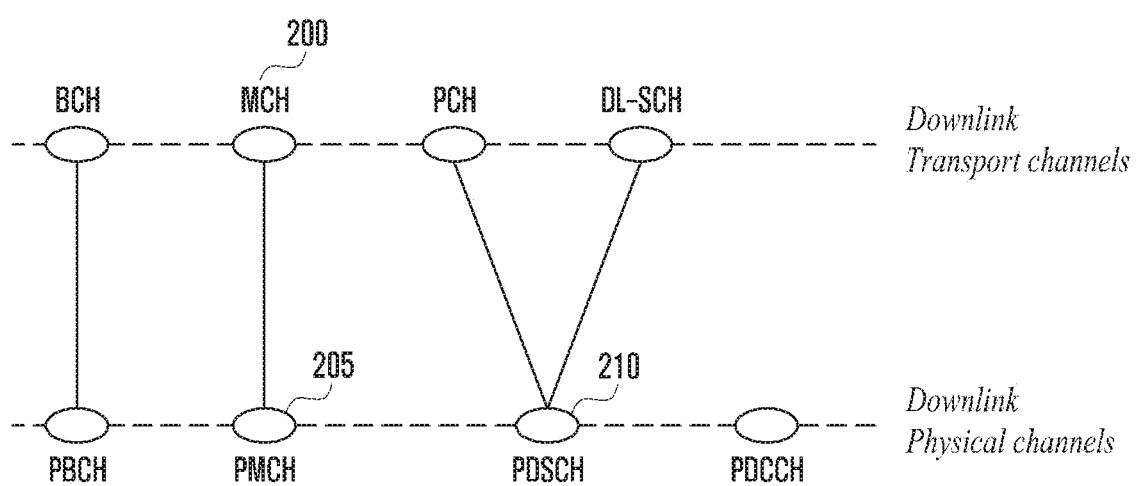
FIG. 2 is a diagram illustrating a downlink channel mapping relationship used for multimedia broadcast multicast service single frequency network (MBSFN) transmission, according to various embodiments of the present disclosure.

FIG. 2 is a diagram illustrating a downlink channel mapping relationship used for MBSFN transmission according to an embodiment of the present disclosure.

Referring to FIG. 2, an MCH 200 which is used between a medium access control (MAC) layer and a physical layer is mapped to a PMCH 205 of a PMCH 205.

A unicast scheme transmitting data only to a specific terminal generally uses a physical downlink shared channel (PDSCH) 210.

Figure 3:
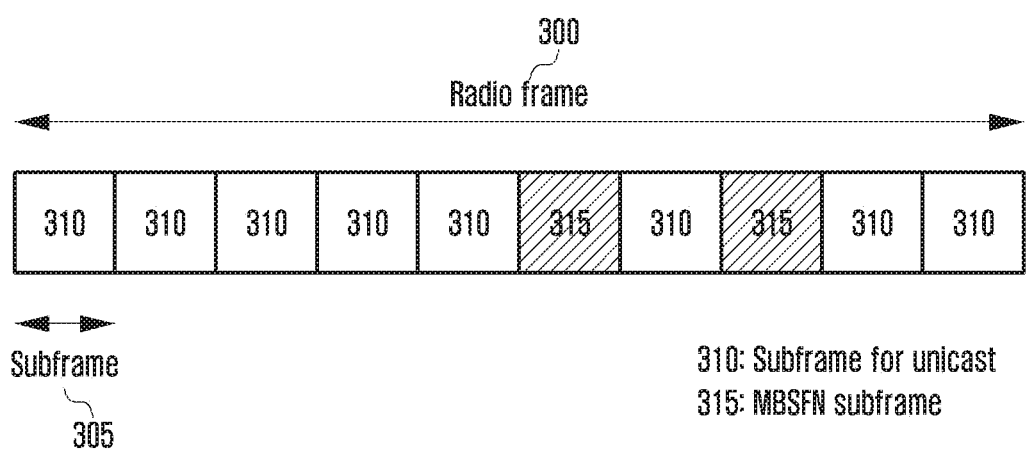
FIG. 3 is a diagram illustrating a structure of a downlink frame used in a long term evolution (LTE) system, according to various embodiments of the present disclosure.

FIG. 3 is a diagram illustrating a structure of a downlink frame used in a long term evolution (LTE) system according to an embodiment of the present disclosure.

Referring to FIG. 3, any radio frame 300 consists of 10 subframes 305. Here, as a form of each of the subframes, there are a form of a 'general subframe 310' used for general data transmission/reception and a form of a 'multimedia broadcast multicast service single frequency network (hereinafter, referred to as MBSFN) subframe 315 used for broadcasting.

As a difference between the general subframe and the MBSFN subframe, there is a difference in the number of orthogonal frequency division multiplexing (OFDM) symbols, a length of a cyclic prefix, a structure and the number of cell-specific reference signals (CRSs), or the like.

Meanwhile, in Rel-8 and Rel-9 systems, the MBSFN subframe has been used only for transmission of broadcast or multicast data, or the like. However, due to the advancement of the system, from an LTE Rel-10, the MBSFN subframe may not only be used for broadcast or multicast, buts may also be for unicast.

In the LTE, to effectively use a PDSCH, each terminal is configured to be divided into a multi-antenna technology and a transmission mode TM associated with a reference signal.

In the current LTE Rel-10, TM1 to TM9 are present. Each terminal has one TM for PDSCH transmission, and No. 8 TM is newly defined in the Rel-9 and No. 9 TM is newly defined in the Rel-10.

In particular, No. 9 TM supports a single user-multi-input multi-output (SU-MIMO) having up to 8 ranks. The No. 9 TM supports transmission of a multiple layer and uses the Rel-10 demodulation reference signal (DMRS) to enable a transmission of up to 8 layers, upon demodulation. Further, the rel-10 DMRS receives a precoded DMRS but need not notify a precoder index to a receiving terminal.

Further, to support the No. 9 TM, in the rel-10, a downlink control information (DCI) format 2C is newly defined. What is unique is that terminals before the ReL-10 does not attempt decoding in the MBSFN subframe. Therefore, allowing all the terminals to attempt the decoding in the MBSFN subframe leads to an upgrade request of a terminal of the previous release.

Among the foregoing TMs, particularly No. 9 TM is a transmission mode using a multiple antenna to maximize transmission efficiency.

According to an embodiment of the present disclosure, a base station receives unicast data even in the MBSFN subframe to configure the No. 9 TM in a terminal requiring a high data throughput and allows only the terminal in which the No. 9 TM is configured to receive the unicast data in the MBSFN subframe.

Meanwhile, for the unicast data transmission and reception, in the LTE system, where data are actually transmitted and received is notified in a PDCCH and actual data are transmitted in a PDSCH. The terminal needs to determine whether resource allocation information allocated to the terminal is present in the PDCCH prior to receiving the actual data.

On the other hand, the MBSFN acquires the resource allocation information by a slightly more complicated process.

Above all, the base station notifies transmission positions of multicast control channels (MCCHs) for each MBSFN area which are provided from the cell to the terminal through a system information block13 (SIB13) that is broadcast information. The MCCH may include the resource allocation information for the MBSFN and the terminal may decode the MCCH to understand the transmission position of the MBSFN subframe.

As described above, the reason for the MBMS to provide the resource allocation information by the scheme different from the existing unicast scheme is for the MBMS to provide the resource allocation information to a terminal which is in a standby mode. Therefore, the transmission position of the MCCH which is a control channel is notified to the SIB13 which is the broadcast information. He overall process of receiving the MBMS service will be described with reference to FIG. 4.

FIG. 4 is a flow chart illustrating a process of receiving, by a terminal, MBSFN according to an embodiment of the present disclosure.

In operation 405, a terminal 400 receives SIB1 from a base station 403. The SIB1 includes scheduling information on other SIBs. Therefore, to receive other SIBs, the SIB1 needs to be first received.

In operation 410, the terminal 400 receives SIB2 from the base station 403. Subframes which may be used for the MBSFN transmission are indicated in MBSFN-subframe-ConfigList IE of the SIB2.

The MBSFN-subframeConfigList IE includes MBSFN-SubframeConfig IE and may indicate which subframe of any radio frame may be the MBSFN subframe. The following Table 1 is a configuration Table of the MBSFN-Subframe-Config IE.

TABLE 1

MBSFN-SubframeConfig information element

-- ASN1START

```
MBSFN-SubframeConfig ::=       SEQUENCE {
    radioframeAllocationPeriod       ENUMERATED {n1, n2, n4, n8, n16, n32},
    radioframeAllocationOffset       INTEGER (0..7),
    subframeAllocation               CHOICE {
        oneFrame                     BIT STRING (SIZE(6)),
        fourframes                   BIT STRING (SIZE(24))
    }
}
```
-- ASN1STOP Here, radioFrameAllocationPeriod and radioFrameAllocationOffset are used to indicate a radio frame having the MBSFN subframe and the radio frame satisfying Equation of SFN mod radioFrameAllocationPeriod=radioFrameAllocationOffset has the MBSFN subframe.

The SFN is a system frame number and indicates a radio frame number. The SFN is repeated, having a range from 0 to 102.

subframeAllocation indicates which subframe is the MBSFN subframe within the radio frame indicated by the above Equation.

It may be indicated in one radio frame unit or four radio frame units. In the case of using the one radio frame unit, it is indicated in oneFrame IE. The MBSFN subframe may be present in Nos. 1, 2, 3, 6, 7, 8 subframes among a total of 10 subframes within one radio frame. Therefore, the oneFrame IE uses 6 bits to indicate the MBSFN subframe among the enumerated subframes.

In the case of using the four radio frame unit, it is indicated in fourFrames IE. To cover the four radio frames, a total of 24 bits are used to indicate the MBSFN subframe among the enumerated subframes in each radio frame.

MBSFN area provided by the cell is transmitted and in operation 420, the terminal receives the MCCHs using the information.

The following Table 2 shows MBSFN-AreaInfoList IE.

The MCHH corresponding to each MBSFN area is present and MBDFN-AreaInfoList IE includes MCCH scheduling information of all the MBSFN areas. The MBSFN-AreaInfo IE includes the MCCH scheduling information and other information. Mbsfn-AreaId is an MBSFN area ID. Non-MBSFNregionLength represents the number of symbols corresponding to a non-MBSFN area among symbols within the MBSFN subframe. The symbol is located at a head portion of the subframe. notificationIndicator is used to indicate a PDCCH bit which notifies the termination of a change of the MCCH information. Mcch-Config IE contains the MCCH scheduling information. Mcch-RepetitionPeriod and mcch-Offset are used to represent a position of the frame including the MCCH. Mcch-ModificationPeriod is a transmission period of the MCCH and sf-AllocInfo indicates the position of the subframe including the MCCH within the frame including the MCCH. signallingMCS represents a subframe indicated by the sf-AllocInfo and a modulation and coding scheme (MCS) applied to (P)MCH.

TABLE 2

MBSFN-AreaInfoList information element

-- ASN1START

```
MBSFN-AreaInfoList-r9 ::=         SEQUENCE (SIZE(1..maxMBSFN-Area)) OF MBSFN-AreaInfo-r9

MBSFN-AreaInfo-r9 ::=             SEQUENCE {
    mbsfn-AreaId-r9                   INTEGER (0..255),
    non-MBSFNregionLength             ENUMERATED {s1, s2},
    notificationIndicator-r9          INTEGER (0..7),
    mcch-Config-r9                    SEQUENCE {
        mcch-RepetitionPeriod-r9          ENUMERATED {rf32, rf64, rf128, rf256},
        mcch-Offset-r9                    INTEGER (0..10),
        mcch-ModificationPeriod-r9        ENUMERATED {rf512, rf1024},
        sf-AllocInfo-r9                   BIT STRING (SIZE(6)),
        signallingMCS-r9                  ENUMERATED {n2, n7, n13, n19}
    },
    ...
}
```

Therefore, the terminal may use the MBSFN-SubframeConfigList IE to accurately know a subframe which may be the MBSFN subframe.

If the terminal 400 wants to receive the MBSFN, in operation 415, the terminal 400 receives SIB13 from a base station 405. MBSFN-AreaInfoList IE of the SIB13 includes positional information in which the MCCHs for each The position of the resource used for the MBSFN transmission is indicated in the MBSFNAreaConfiguration IE of the MCCH and in operation 425, the terminal uses the information to receive the MBSFN subframe. commonSF-Alloc represents a subframe allocated to the MBSFN area. commonSF-AllocPeriod is a period where the subframes indicated by the commonSF-Alloc are repeated.

Pmch-InfoList IE includes all PMCH configuration information of one MBSFN area.

TABLE 3

| MBSFNAreaConfiguration message |
| --- |
| -- ASN1START |
| MBSFNAreaConfiguration-r9 ::= SEQUENCE { |
|    commonSF-Alloc-r9               CommonSF-AllocPatternList-r9, |
|    commonSF-AllocPeriod-r9      ENUMERATED { |
|                                   rf4, rf8, rf16, rf32, rf64, rf128, rf256}, |
|    pmch-InfoList-r9                PMCH-InfoList-r9, |
|    nonCriticalExtension         MBSFNAreaConfiguration-v930-IEs |
|    OPTIONAL |
| } |
| MBSFNAreaConfiguration-v930-IEs ::= SEQUENCE { |
|    lateNonCriticalExtension     OCTET STRING      OPTIONAL,   - |
| - Need OP |
|    nonCriticalExtension         SEQUENCE { }        OPTIONAL |
|    -- Need OP |
| } |
| CommonSF-AllocPatternList-r9 ::=SEQUENCE (SIZE (1..maxMBSFN-Allocations)) OF MBSFN-SubframeConfig |
| -- ASN1STOP |

In operation 430, the terminal gets the position of the MBSFN subframe in which the multicast traffic channel (MTCH) in an MCH scheduling information MAC CE which is one of the MAC control elements (CEs) of received MAC PDU is transmitted In operation 435, the terminal obtains and uses the MCH scheduling information to decode the MTCH.

Figure 5A:
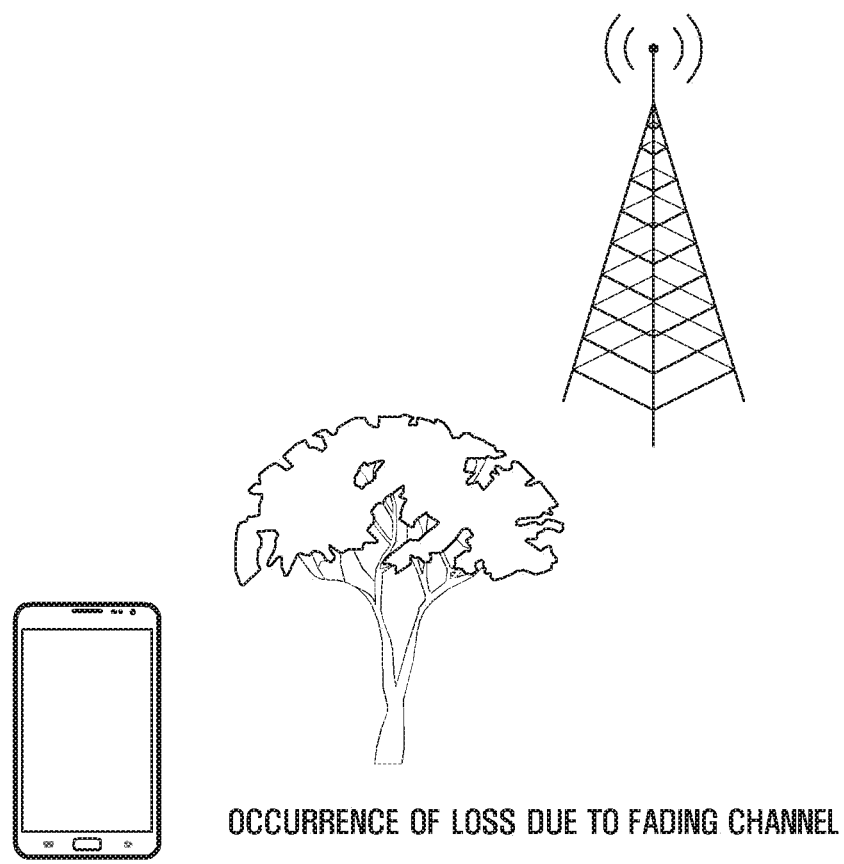
FIGS. 5A and 5B are diagrams for describing a problem of a case of providing group communication using MBMS, according to various embodiments of the present disclosure.
Figure 5B:
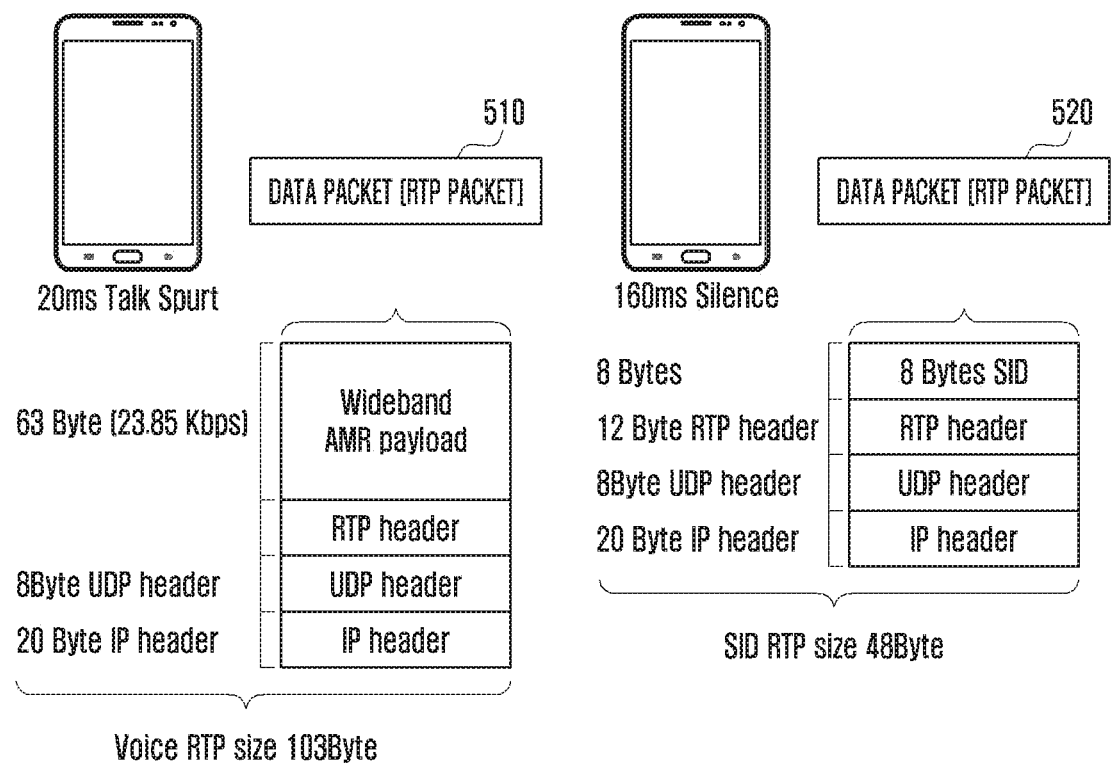

FIGS. 5A and 5B are diagrams for illustrates providing group communication using MBMS according to an embodiment of the present disclosure.

FIG. 5A is a diagram for describing a fading channel.

When obstacles (for example, tree, building, or the like) are present between the terminal and the base station, a loss of data may occur. In the LTE system, a hybrid ARQ (HARQ) retransmission technique is used to prevent the data from being lost. For example, when not receiving data, a receiving terminal transmits HARQ NACK to a transmitting terminal, in which the transmitting terminal may retransmit the data to prevent the data from being lost.

However, in the case of the terminal using the eMBMS service, even when the terminal does not receive some of the data, the base station may not perform the HARQ retransmission to each of the terminals using the eMBMS service. The reason is that an excessive overhead may occur when the data are retransmitted to each of the terminals using a broadcasting service depending on whether the data are lost.

Referring to FIG. 5A, the obstacles are present between the terminal and the base station and therefore data transmitted through subframes 1, 2, and 3 are lost, the terminal and the base station may not perform the HARQ retransmission. Therefore, the terminal using the eMBMS service uses application layer forward error correction AL-FEC to be able to prevent the data from being lost and secure stability of the data transmission.

FIG. 5B is a diagram for describing a problem of a case of providing group communication using eMBMS according to an embodiment of the present disclosure.

FIG. 5B illustrates a voice packet transmitted by a public safety network terminal as an example of a data packet 510 transmitted in the eMBMS service.

Referring to FIG. 5B, a size of the data packet 510 generated in the terminal during the group communication is 103 bytes in a 20 ms unit and a size of a data packet 520 generated in the terminal which does not perform the group communication is 48 bytes in a 20 ms unit. As such, since the size of the data packet transmitted from the terminal using the group communication is very small, it is difficult to recover data using the AL-FEC unlike the existing video broadcasting transmitted over several TTIs when 1TTI (subframe in a unit of 1 ms) is lost.

The present disclosure proposes to solve the above problems and provides a method (used as the same meaning as the method for securing reliability of group communication in the present disclosure) and apparatus for preventing data from being lost when the base station or the broadcasting server uses the eMBMS in the public safety network.

Figure 6:
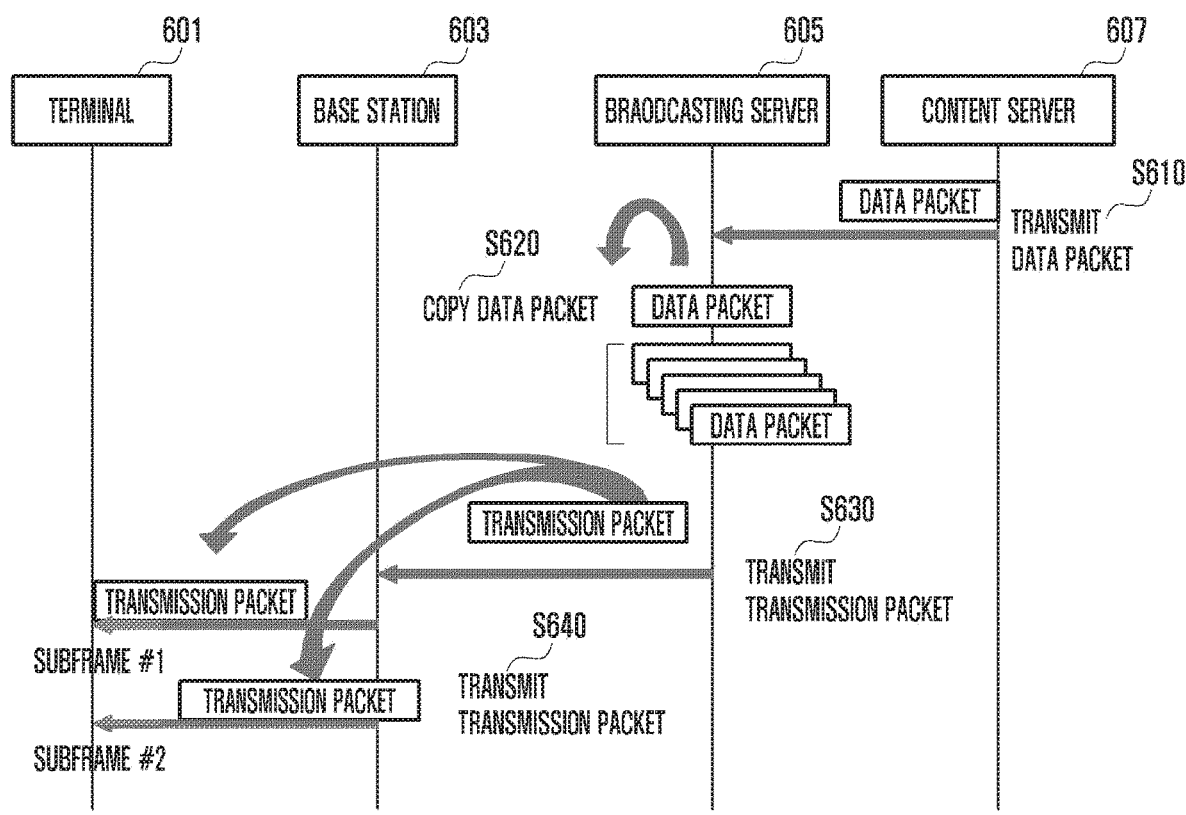
FIG. 6 is a flow chart providing group communication using evolved MBMS (eMBMS) according to an embodiment of the present disclosure.

FIG. 6 is a flow chart for providing group communication using eMBMS according to an embodiment of the present disclosure.

Referring to FIG. 6, in operation S610, a content server 607 may transmit a data packet to the broadcasting server 605.

The content server 607 may include, for example, a push to talk server for supporting group communication, in which the push to talk server may transmit an encoded voice payload from a vocoder to the broadcasting server 605 by carrying the encoded voice payload on a real time transport protocol (RTP).

The broadcasting server may include, for example, a broad multicast service center (BM-SC) for providing a broadcasting service. Further, the data packet may include, for example, a voice packet generated in the group communication.

In operation S620, the broadcasting server 605 receiving the data packet may copy the received data packet. The reason of copying the data packet received by the broadcasting server 605 is as follows.

When the broadcasting server uses the eMBMS to provide the group communication, if some of the data included in one subframe are lost, the terminal may not receive all the data included in the subframe. Further, since the size of the data packet generated in the group communication is very small, if some of the data included in the subframe are lost, it is difficult to recover the data even in the case of using the AL-FEC.

However, when the data are transmitted in at least two subframes, the terminal may use received data in other subframes even when the data are lost in some of the subframe to recover the received data.

Therefore, according to the present embodiment, in operation S620, the broadcasting server 605 repeatedly copies the data packet received from the content server 607 at a size at which the data packet may be transmitted through at least two subframes and transmits the copied data packet to the base station. For example, the broadcasting server 605 may copy the data packet to exceed the size of the packet which may be transmitted through one subframe. That is, the broadcasting server 605 may copy the data packet to exceed a predetermined packet size. Further, the base station transmits the copied data packet to the terminal through at least two subframes to be able to prevent the data from being lost in the group communication and secure the reliability of the group communication.

According to the present embodiment, the broadcasting server describes an example of copying the data packet but the present disclosure is not limited thereto. For example, the content server copies the data packet and transmits the copied data packet to the broadcasting server or the broadcasting server receiving the data packet may copy the data packet.

After the data packet is copied, in operation S630, the broadcasting server 605 may transmit the copied data packet to the base station 603. The broadcasting server 605 may combine the repeatedly copied data packets with a synchronization (SYNC) header to configure a transmission packet and may transmit the configured transmission packet to the base station 603. In this case, since the size of the copied data packet exceeds the size of the data packet which may be transmitted in one subframe, the broadcasting server 605 may configure the repeatedly copied data packets in at least two transmission packets and transmit the configured transmission packets to the base station.

In operation S640, the base station 603 receiving the transmission packet may transmit the transmission packet to the terminal. The base station 603 may transmit the transmission packet to the terminal 601 through at least two subframes. In this case, the base station 603 may transmit some of the transmission packet to a first subframe and transmit the rest of the transmission packet to a second subframe. In this case, the first subframe and the second subframe may include the farthest located subframe among the subframes in which the transmission packet may be transmitted or the first subframe and the second subframe may be adjacent on the radio frame. The base station may store a subframe pattern which is information associated with positions of the first subframe and the second frame or receive the subframe pattern from the broadcasting server and may use the subframe pattern to transmit the transmission packet to the terminal through the at least two subframe.

Figure 7:
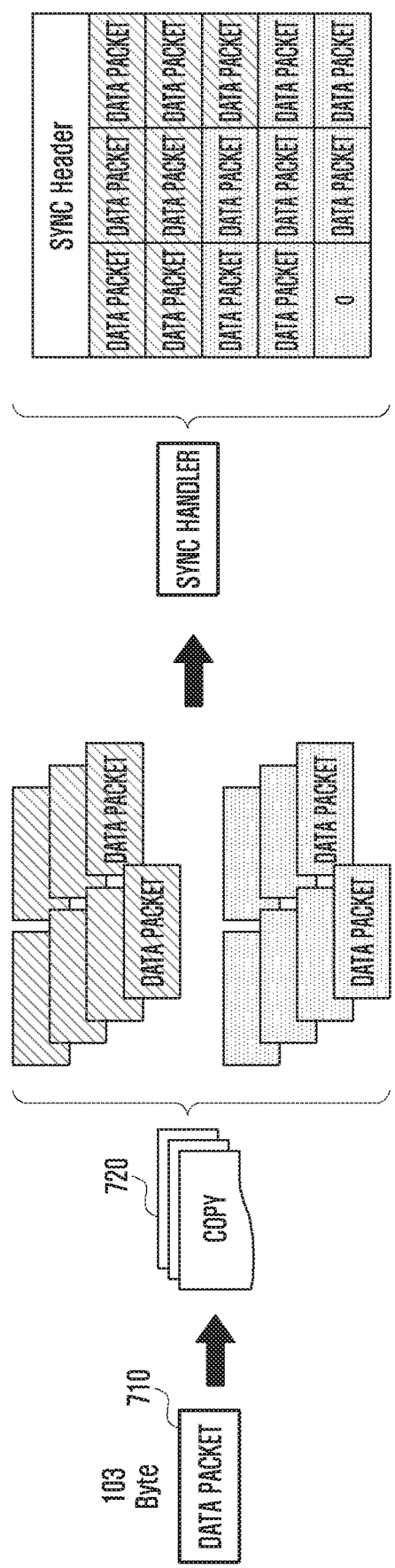
FIG. 7 is a diagram illustrating a process of copying, by a broadcasting server, a data packet according to an embodiment of the present disclosure.

FIG. 7 is a diagram illustrating a process of copying, by a broadcasting server, a data packet according to an embodiment of the present disclosure.

Referring to FIG. 7, the broadcasting server may receive a data packet from the content server. The data received by the content server may include, for example, a voice packet 710 for group communication using the MBMS in the public safety network, in which the size of the voice packet may be 103 bytes.

The broadcasting server may repeatedly copy the received data packet so that the received data packet is transmitted through at least two subframes 720. For example, the broadcasting server may repeatedly copy the data packet to exceed the size of the packet which may be transmitted through one subframe. In this case, a method for determining a number of copying is as follows.

The broadcasting server may receive a QoS class identifier (QCI) differently defined according to the channel environment from a group communication server. Further, a mapping table of the QCI and a mapping table of an MCS level may be stored in the broadcasting server, in which the broadcasting server may use the received QCI value and the mapping table to determine the MCS level. Further, the broadcasting server may determine a number of copying the data packet based on the determined MCS level. For example, when the MCS level is determined as 7 and thus the encoding is performed, the broadcasting server may configure the data packet so that the data packet are repeatedly copied at least eight times or more. However, the number of copying depending on the MCS level may be preset to be stored in the broadcasting server or may be received from the content server.

FIG. 7 may illustrate the case in which as an example of the present disclosure, and when the MCS level is 7, illustrates the case in which the copying frequency of the data packet is set as 14 times. Therefore, the broadcasting server of confirming the MCS level may repeatedly copy the data packet 14 times and transmit the repeatedly copied data packet to the base station.

Alternately, the broadcasting server may receive the MCS level from the base station. The base station may know information associated with the amount of data which may be physically transmitted in the subframe and the broadcasting server may receive the information from the base station and use the received information to copy the data packet.

After generating 14 data packets, an SYNC handler of the broadcasting server may combine the data packet with the SYNC header to generate the transmission packet. Further, the broadcasting server may transmit the generated transmission packet to the base station by carrying the generated transmission packet on an SYNC protocol.

However, the MCS level is an example of parameters used to copy the data packet. The broadcasting server may determine the frequency of copying the data packet using other methods (for example, other parameters).

Figure 8:
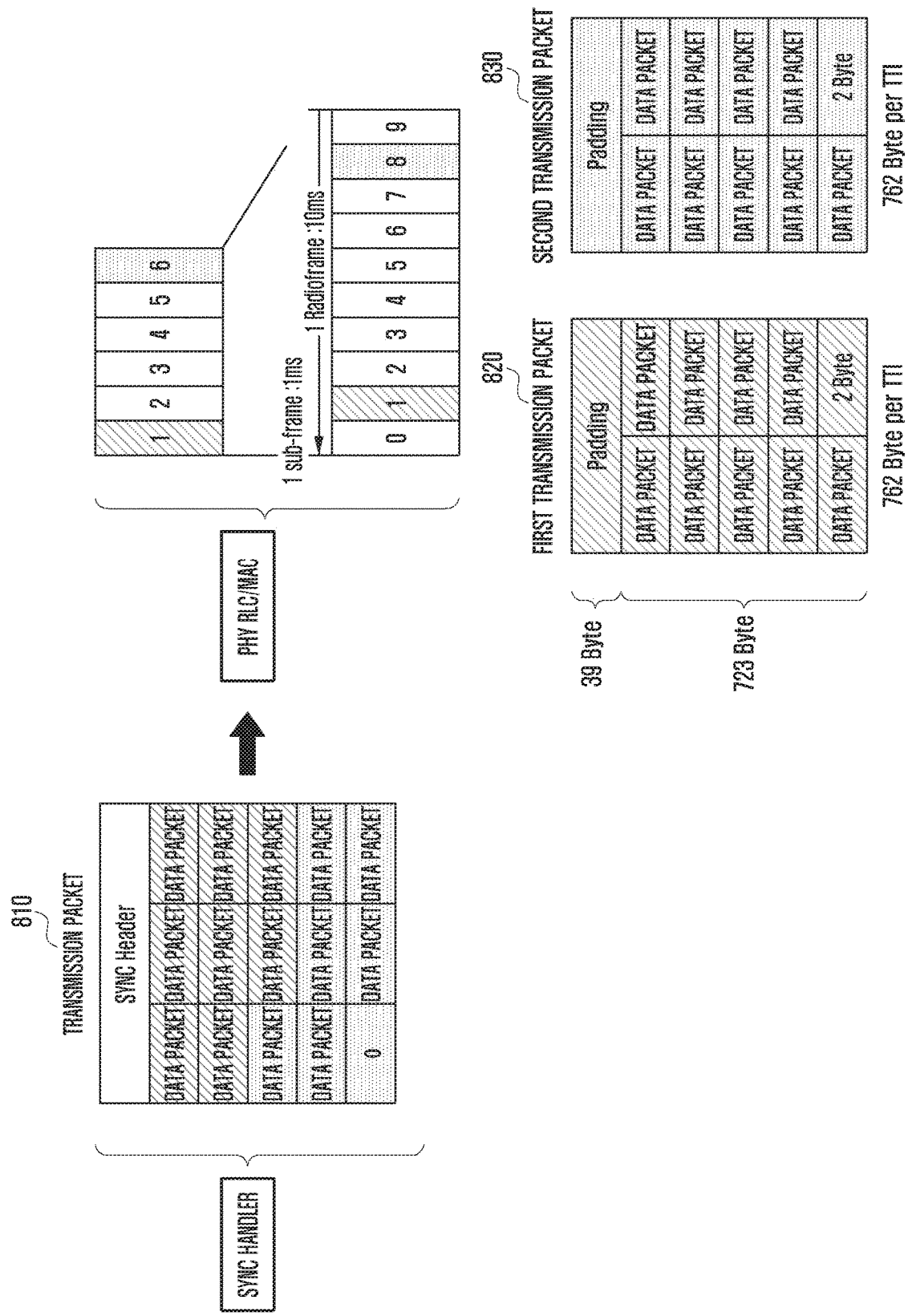
FIG. 8 is a diagram illustrating a process of transmitting, by a base station, a received transmission packet to a terminal according to an embodiment of the present disclosure.

FIG. 8 is a diagram illustrating a process of transmitting, by a base station, a received transmission packet to a terminal according to the first embodiment of the present disclosure.

Referring to FIG. 8, the base station may transmit a received transmission packet 810 to the terminal through a physical (PHY)/radio link control (RLC)/MAC layer depending on an MCH scheduling period. The base station may divide the transmission packet 810 into a first transmission packet 820 and a second transmission packet 830 to transmit a first subframe transmission packet to the terminal through a first subframe and transmit a second subframe transmission packet to the terminal through a second subframe.

In this case, the first subframe and the second subframe may include at least two subframes which are farthest located among the subframes through which the transmission packet may be transmitted. On the other hands, the first subframe and the second subframe may include at least two subframes which are adjacent on the radio frame. The reason is that when the transmission packet is transmitted through at least two subframes, a loss rate of the data may be reduced.

The base station may store the subframe pattern which is the information associated with the subframe for transmitting the transmission packet or receive the subframe pattern from broadcasting server and may use the subframe pattern to transmit the transmission packet to the terminal through the at least two subframes. For example, in the present drawing, when the subframe through which the transmission packet may be transmitted is subframes 1, 2, 3, 6, 7, and 8, and the base station may use the subframes 1 and 8 to transmit the data packet.

Figure 9:
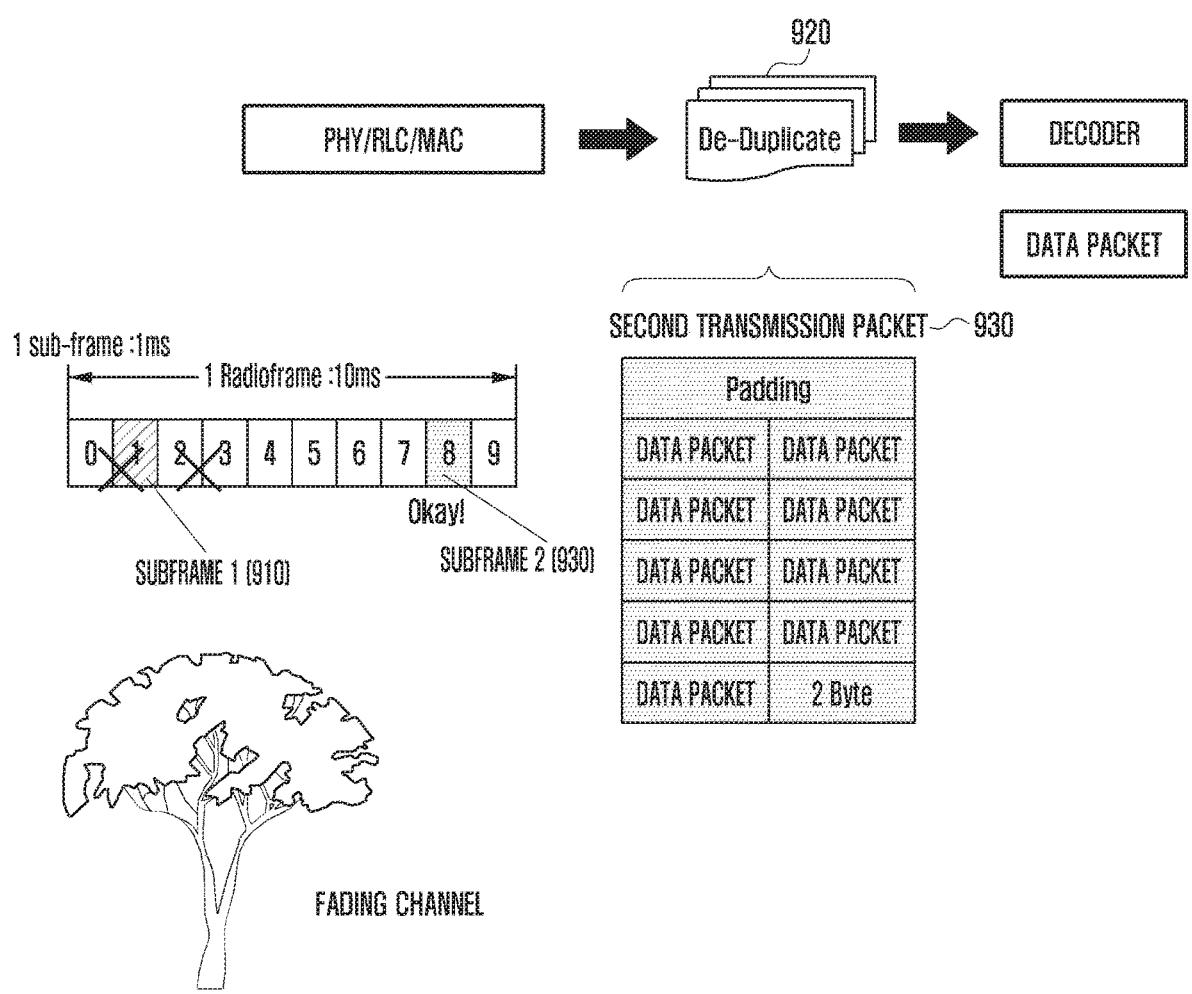
FIG. 9 is a diagram illustrating a process of receiving, by a terminal, data according to an embodiment of the present disclosure.

FIG. 9 is a diagram illustrating a process of receiving, by a terminal, data according to the first embodiment of the present disclosure.

Referring to FIG. 9, the terminal receives the first transmission packet and the second transmission packet, which are transmitted from the base station through the subframe 1 and the subframe 8, through the PHY/RLC/MAC layer.

In the present embodiment, it is assumed, a fading channel is present between the terminal and the base station. Even when the terminal does not receive the first transmission packet in the first subframe (subframe 1) (910) due to the fading channel, the terminal may receive the second transmission packet in the subframe 8 (920).

The terminal receiving a second transmission packet 930 through the subframe 8 (920) may delete the rest data packets other than one of the data packets included in the second transmission packet 930. Further, the terminal may transmit the data packet to an upper application to receive the data.

By the process, the terminal may receive data without the loss of the data even when the fading channel is present between the terminal and the base station.

Figure 10:
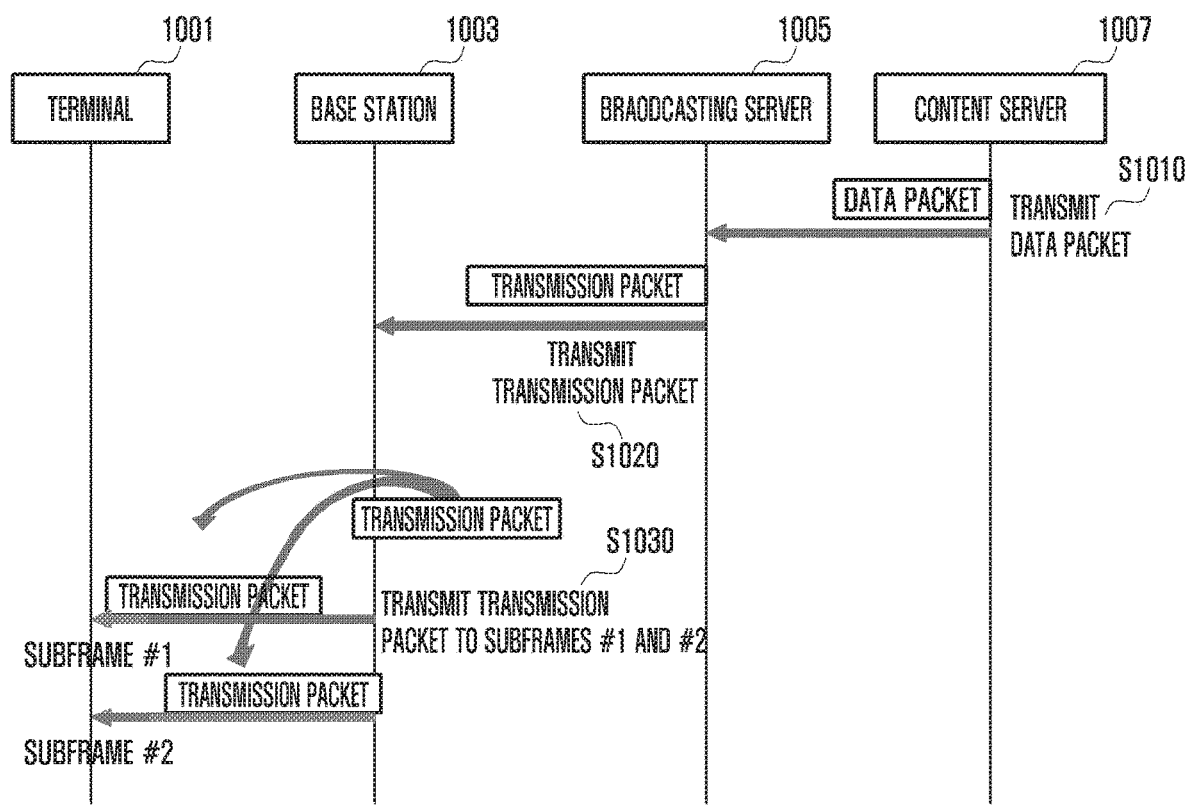
FIG. 10 is a flow chart providing group communication using eMBMS according to an embodiment of the present disclosure.

FIG. 10 is a flow chart providing group communication using eMBMS according to an embodiment of the present disclosure.

Referring to FIG. 10, in operation S1010, a content server 1007 may transmit the data packet to a broadcasting server 1005.

The content server may include, for example, the push to talk server for supporting group communication, in which the push to talk server may transmit the encoded voice payload from the vocoder to the broadcasting server 1005 by carrying the encoded voice payload on the real time transport protocol (RTP).

The broadcasting server 1005 may mean, for example, the broad multicast service center (BM-SC) for providing a broadcasting service. Further, the data packet may include, for example, the voice packet generated in the group communication.

In operation 1020, the broadcasting server 1005 receiving the data packet may transmit the transmission packet in which the received data packet is combined with the SYNC header to the base station 1003.

In operation S1030, the base station 603 receiving the transmission packet may transmit the transmission packet to the terminal 1001.

The base station may repeatedly copy the data packet included in the transmission packet as in the broadcasting server of FIG. 7 or transmit the data packet stored in a buffer or the repeatedly copied data packet to the terminal through at least two subframes. In this case, the base station may know the information associated with the amount of data which may be physically transmitted in each subframe, and therefore may copy the data packet to transmit the data packet through at least two subframes using the information.

In an alternate embodiment, the base station may repeatedly transmit the transmission packet received from the broadcasting server through at least two subframes without copying the received data packet. The size of the transmission packet may be a size which may be transmitted through one subframe. Therefore, the base station may repeatedly transmit the same transmission packet through at least two subframes. To this end, even after the base station transmits the transmission packet, the base station stores the transmission packet in the buffer and then may again transmit the same transmission packet at subsequent transmission timing (for example, MAC transmission timing depending on the MAC transmission period). Alternatively, the base station may copy the transmission packet to repeatedly transmit the transmission packet through the two subframes. In this case, the base station may transmit the transmission packet to the terminal through at least two subframes which are farthest located among the subframes through which the transmission packet may be transmitted.

As such, the reason of transmitting the transmission packet to the terminal through at least two subframes is to recover the data transmitted by the base station using the transmission packets transmitted through other subframes even when the transmission packet transmitted through one subframe is lost.

By transmitting the transmission packet through at least two subframes as described above, the base station may improve the reliability of the group communication.

Figure 11:
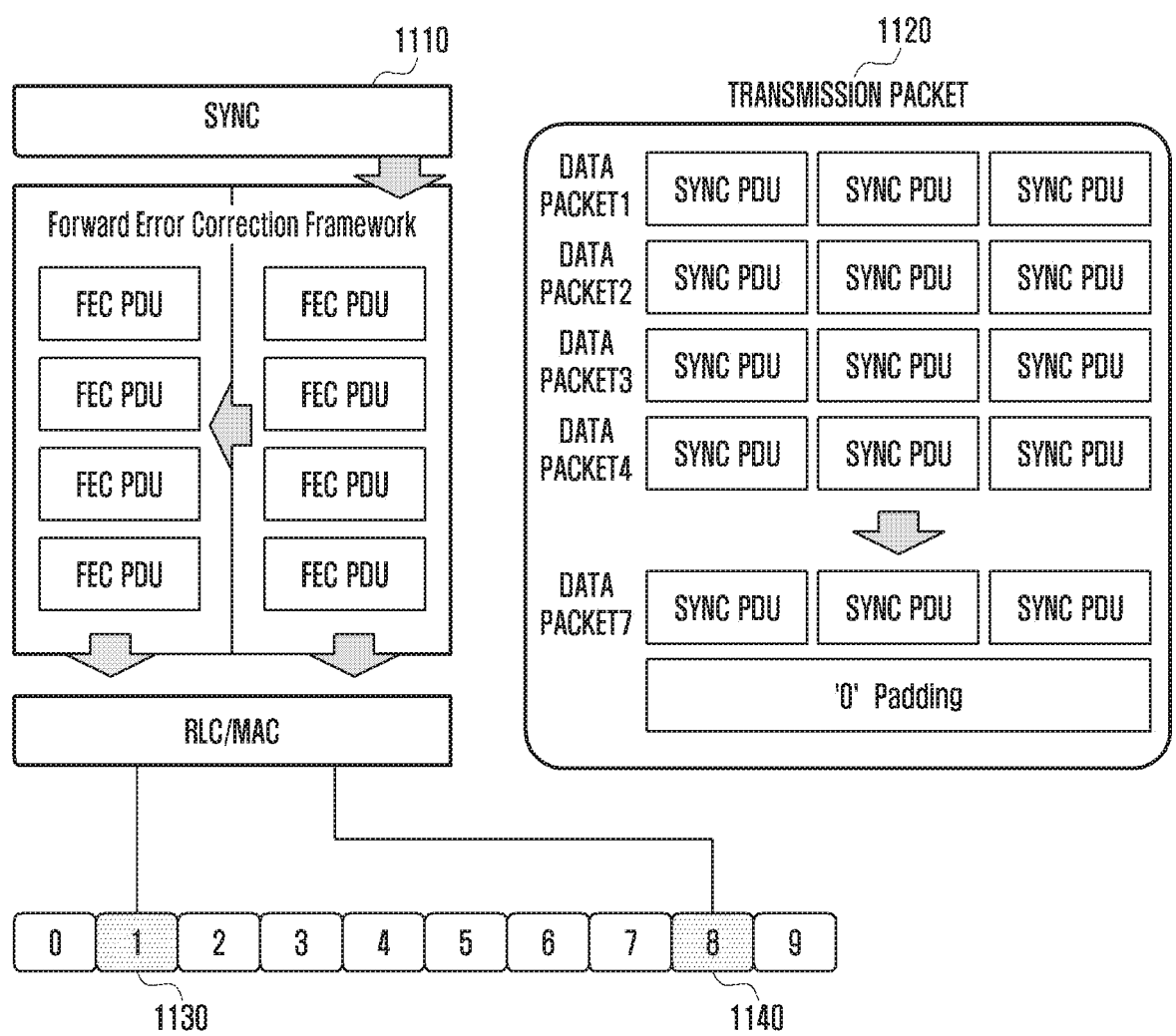
FIG. 11 is a diagram illustrating a process of transmitting, by a base station, a transmission packet according to an embodiment of the present disclosure.

FIG. 11 is a diagram illustrating a process of transmitting, by a base station, a transmission packet according to an embodiment of the present disclosure.

Referring to FIG. 11, the base station may receive the transmission packet from the broadcasting server through an SYNC protocol 1110. In this case, the received transmission packet may be represented like a transmission packet 1120.

The transmission packet 1120 may be the form that the data packet transmitted from the content server is repeatedly copied in the broadcasting server to be combined with the SYNC header (first embodiment). Alternatively, the transmission packet 1120 may be the form that the data packet transmitted from the content server combined with the SYNC header without being repeated copied (second embodiment).

For example, the transmission packet 1120 may be a form including at least one of data packets 1 to 7.

According to an embodiment of the present disclosure, when the broadcasting server receives the data packets 1 to 4 from the content server, the broadcasting server may repeatedly copy the data packets 1 to 4 to generate the transmission packet 1120 configured of seven data packets. As described above, the broadcasting server repeatedly copies the data packet to exceed the size of the packet which may be transmitted through one subframe, to thereby generate the transmission packet. The broadcasting server generating the transmission packet 1120 may transmit the generated transmission packet 1120 to the base station.

As described above, the size of the transmission packet 1120 is increased by repeatedly copying the data packet as described above, such that the base station may not transmit the transmission packet 1120 through one subframe. Therefore, the base station may transmit the received transmission packet to the terminal through at least two subframes at the same transmission period (for example, MAC transmission period) or two continuous transmission periods. In this case, the base station may transmit the transmission packet to the terminal through at least two subframes which are farthest located among the subframes through which the transmission packet may be transmitted. In the present drawing, the base station may transmit the transmission packet to the terminal through subframe 1 1130 and subframe 8 1140.

Meanwhile, according to a second embodiment of the present disclosure, when the broadcasting serer receives packets 1 to 4, the broadcasting server generates the transmission packet configured of the packets 1 to 4 and transmits the generated transmission packet to the base station. For example, the broadcasting server does not perform the process of repeatedly copying the data packet unlike the first embodiment.

Like the broadcasting server of the first embodiment, the base station receiving the transmission packet may repeatedly copy the data packet included in the received transmission packet and transmit the repeatedly copied data packet through at least two subframes at the same transmission period (for example, MAC transmission period) or the two continued transmission period.

Alternatively, the base station may repeatedly transmit the transmission packet to the terminal through at least two subframes without repeatedly copying the received transmission packet. In this case, even after the base station transmits the transmission packet, the base station stores the transmission packet in the buffer and then may again transmit the same transmission packet at subsequent MAC transmission timing (for example, MAC transmission timing depending on the MAC transmission period). Alternatively, the base station may copy the transmission packet to repeatedly transmit the transmission packet through the two subframes.

That is, the base station may repeatedly transmit the same transmission packet through at least two subframes at the same transmission period or the two continued transmission period.

Further, when transmitting the transmission packet through the two subframes at the same transmission period (for example, MAC transmission period), the base station may transmit the transmission packet to the terminal through at least two subframes which are farthest located among the subframes through which the transmission packet may be transmitted. In the present drawing, the base station may transmit the transmission packet to the terminal through the subframe 1 1130 and the subframe 8 1140.

By transmitting the transmission packet through at least two subframes as described above, the base station may solve the problem that the data are lost.

Figure 12:
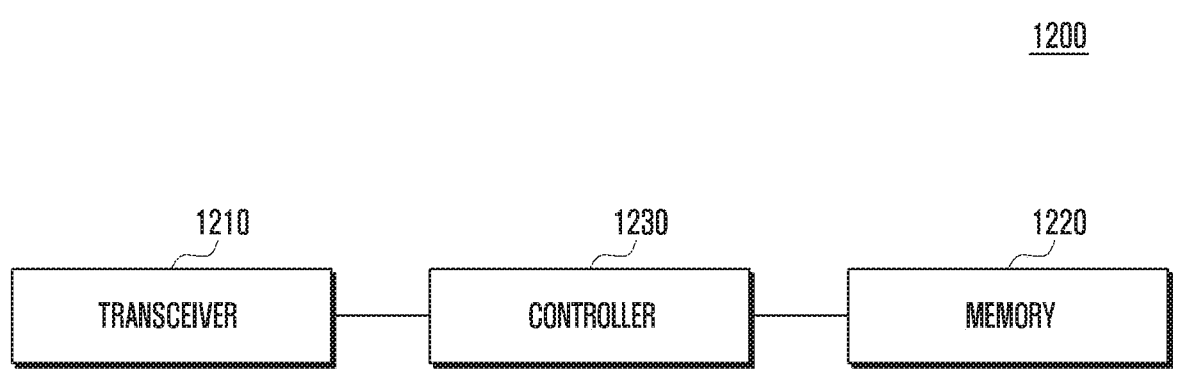
FIG. 12 is a diagram illustrating a configuration of a broadcasting server 1200 according to an embodiment of the present disclosure.

FIG. 12 is a diagram illustrating a configuration of a broadcasting server 1200 according to an embodiment of the present disclosure.

Referring to FIG. 12, a broadcasting server 1200 of the present disclosure may be configured to include a transceiver 1210, a memory 1220, and a controller 1230.

The transceiver 1210 may perform communication with other network entities. The transceiver 1210 may receive the data packet from the content server and transmit the data packet to the base station. Further, the transceiver 1210 may receive the QCI value from another server or receive the MCS level from the base station.

The memory 1220 may store a table representing a mapping relationship between the QCI value and the MCS level. The table may use the QCI value received from another server to be used to determine the MCS level. Further, the memory 1220 may store the data packet received from the content server and the stored data packet may be used to configure the transmission packet.

The controller 1230 may use the QCI value received from another server to determine the MCS level. The controller 1230 may be referred to as a processor. The controller 1230 may use the determined MCS level or the MCS level received from the base station to determine the frequency of repeatedly copying the data packet. When the repeat copying frequency is determined, the controller 1230 may repeatedly copy the data packet depending on the determined frequency. Further, the controller 1230 may combine the repeatedly copied packet with the SYNC header and 0 padding to configure the transmission packet. The controller 1230 configuring the transmission packet may control the transmission packet to be transmitted to the base station.

Figure 13:
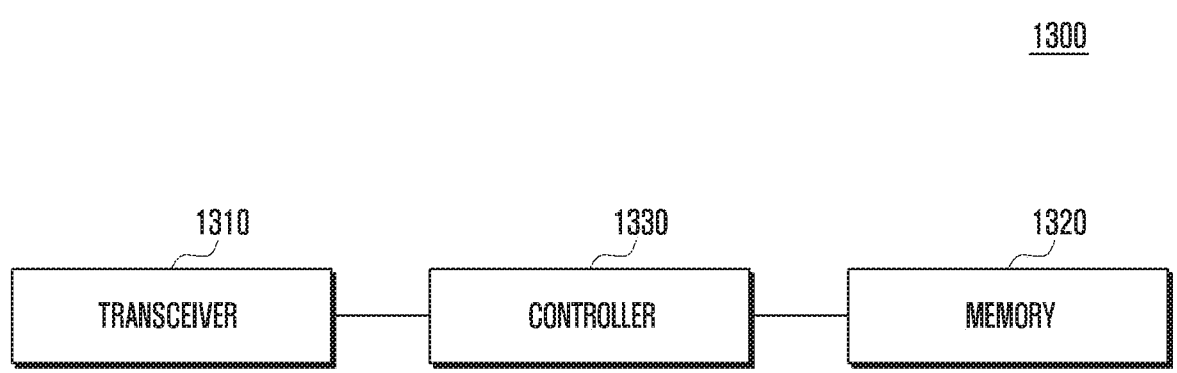
FIG. 13 is a diagram illustrating a configuration of a base station 1300 according to an embodiment of the present disclosure.

FIG. 13 is a diagram illustrating a configuration of a base station 1300 according to an embodiment of the present disclosure.

Referring to FIG. 13, a base station 1300 of the present disclosure may be configured to include a transceiver 1310, a memory 1320, and a controller 1330.

The transceiver 1310 may perform communication with other network entities. The transceiver 1310 may transmit the MCS level for determining the repeat copying frequency to the broadcasting server. Further, the transceiver 1310 may receive the transmission packet or the data packet from the broadcasting server and transmit the transmission packet or the data packet to the terminal. In this case, the transceiver 1310 may transmit the transmission packet or the data packet to the terminal through at least two subframes.

The memory 1320 may store the transmission packet received from the broadcasting server in the buffer. The stored transmission packet may be repeatedly transmitted to the terminal through at least two subframes. The at least two subframes may be seperated apart from each other or adjacent on a radio frame.

The controller 1330 may determine the MCS level depending on a channel state. The controller 1330 may be referred to as a processor. Further, the controller 1330 may use the determined MCS level to determine the frequency of repeatedly copying the data packet and transmit the determined frequency to the broadcasting server. Further, the controller 1330 may control the transmission packet received from the broadcasting server to be transmitted to the terminal through at least two subframes. In this case, the controller 1330 copies the data packet included in the received transmission packet as much as the determined repeat copying frequency and transmit the copied data packet to the terminal.

Alternatively, the controller 1330 may transmit the received transmission packet to the terminal through at least two subframes. In this case, even after the controller 1330 transmits the transmission packet, the controller 1330 stores the transmission packet in the buffer and then may again transmit the same transmission packet at subsequent MAC transmission timing (for example, MAC transmission timing depending on the MAC transmission period). Alternatively, the base station may copy the transmission packet to repeatedly transmit the transmission packet through the two subframes. Further, the controller 1330 may repeatedly transmit over the same transmission period or the two continued transmission period. In this case, the base station may transmit the transmission packet to the terminal through at least two subframes which are farthest located among the subframes through which the transmission packet may be transmitted when transmitting the transmission packet through the two subframes at the same MAC transmission period.

Figure 14:
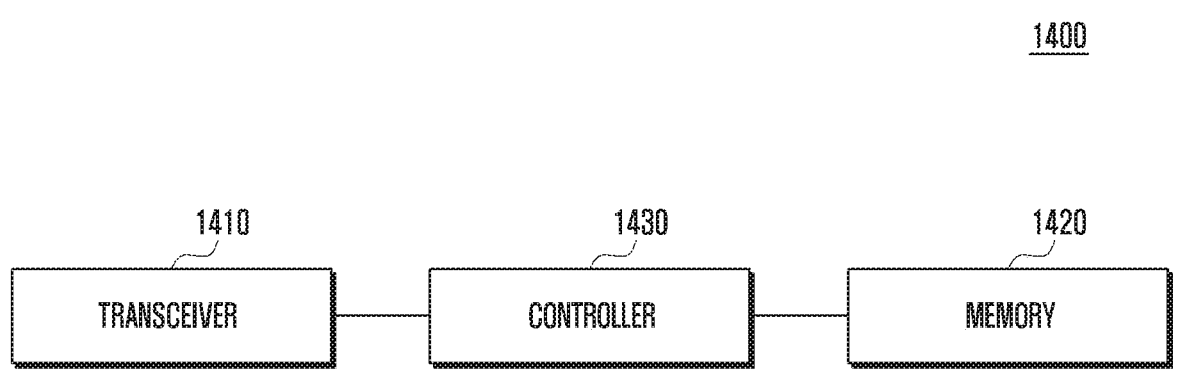
FIG. 14 is a diagram illustrating a configuration of a terminal 1400 according to an embodiment of the present disclosure.

FIG. 14 is a diagram illustrating a configuration of a terminal 1400 according to the present disclosure.

Referring to FIG. 14, a terminal 1400 of the present disclosure may be configured to include a transceiver 1410, a memory 1420, and a controller 1430.

The transceiver 1410 may perform communication with other network entities. The transceiver 1410 may receive the transmission packet from the base station through at least two subframes.

The memory 1420 may store the transmission packet received from the base station. The stored transmission packet may be used to recover the data when the data are lost.

When the transmission packet is received from the base station through at least two subframes, the controller 1430 may control the rest data packets other than one of the data packets included in the transmission packet to be deleted. The controller 1430 may be referred to as a processor. Therefore, even when the data packet received through any one of the at least two subframes is lost, it is possible to recover the data transmitted by the base station using the data packet received through another subframe.

Figure 15:
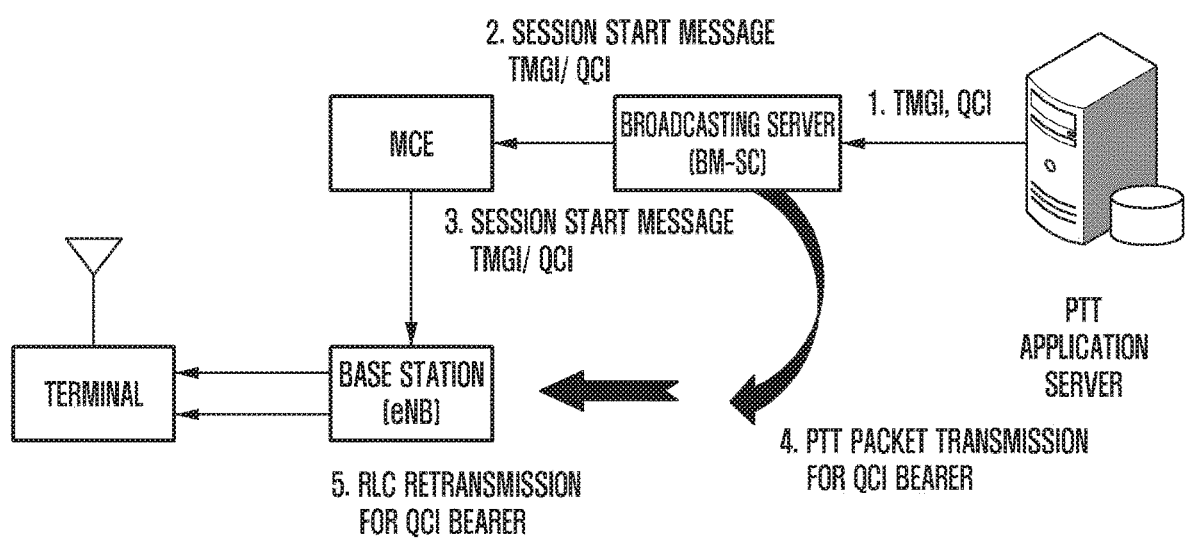
FIG. 15 is a flow diagram of providing quality of service (QoS) class identifier (QCI) based group communication push-to-talk (PTT) service group communication according to an embodiment of the present disclosure.

FIG. 15 is a flow diagram of providing QoS class identifier (QCI) based group communication (PTT service group communication) according to a first embodiment of the present disclosure.

According to an embodiment of the present disclosure, the base station may use a method for storing or copying a transmission packet in a buffer and repeatedly transmitting the transmission packet to reduce the loss rate of data. However, the base station does not repeatedly transmit the video packet, or the like and therefore the base station receiving the packet needs to determine whether the packet is a packet to be repeatedly transmitted. In this case, the base station may use QCI received from the broadcasting server.

Referring to FIG. 15, the PTT application server (or content server) may transmit operator specific identifier (QCI, for example, 65, 66) or an extendable operator specific identifier (QCI) for an eMBMS based PTT to the broadcasting server. In this case, the PTT application server (or content server) may transmit a temporary mobile group identify (TMGI) value to the broadcasting server (BM-SC) along with the QCI value.

The broadcasting server receiving the QCI may transmit a session start message including the QCI value to multi-cell/multicast coordination entity (MCE). In this case, the temporary mobile group identify (TMGI) value may be included in the session start message.

The MCE receiving the message may transmit the session start message or the MBMS scheduling information message including the QCI value to an evolved node B (eNB).

The eNB receiving the message may determine whether to repeatedly transmit the packet defined in the present disclosure depending on the received QCI value. The QCI value may be shown as the following Table 4. The present disclosure describes, for example, the case in which the PTT dedicated QCI has a QCI value of 65. Therefore, the base station may be determined whether to repeatedly transmit the received packet based on the QCI value. Therefore, if it is determined that there is a need to repeatedly transmit the packet, the base station repeatedly transmit the data packet stored in the transmission packet or the data packet stored in the buffer or the repeatedly copied data packet to the terminal through at least two subframes at the same transmission period or the two continued transmission period.

Describing the method for determining whether to repeatedly transmit a packet as an example, the session start message received by the base station or the QCI value included in the MBMS scheduling information may be mapped to the temporary mobile group identify and the IP address. Therefore, the base station may determine whether to repeatedly transmit the received packet depending on the IP address of the packet received by the base station and the QCI value mapped thereto.

TABLE 4

| | Range | Description |
| --- | --- | --- |
| QCI Index | 128~254 | User configurable QCI |
| QCI Index | 65.65 | PTT dedicated QCI |

Meanwhile, when transmitting the transmission packet through the two subframes at the same transmission period, the base station may transmit the transmission packet through the subframes seperated from each other. In this case, the base station may use the subframe pattern to confirm the subframes seperated from each other.

The following Table 5 is an example of a pattern of the subframe. The subframe pattern may be configured of a bitmap and may be configured of a bit map of 6 bits. The bit map may defined in third generation partnership project (3GPP) standard TS36.331. Therefore, the base station may transmit the transmission packet to the at least two subframes depending on the subframe pattern. For example, when the transmission packet is transmitted to the at least two subframe using patterns 1 to 4, it is possible to avoid the loss of the data packet in a fading channel. Further, in the case of using patterns 5 and 6, when the transmission packet is separately transmitted at the two continued MAC transmission period, it is possible to avoid the loss of the data packet in the fading channel.

TABLE 5

| # pattern | Number of Subframes | Pattern |
| --- | --- | --- |
| 1 | 1 | 100000 |
| 2 | 2 | 100001 |
| 3 | 3 | 101001 |
| 4 | 4 | 101101 |
| 5 | 5 | 111101 |
| 6 | 6 | 111111 |

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A terminal in a communication system, the terminal comprising:
a transceiver; and
at least one processor configured to:
receive, via the transceiver from a base station, a transmission packet that is generated based on a small packet having a size less than a data packet size corresponding to a transmission time interval (TTI),
identify a duplicated packet included in the transmission packet, and
discard the duplicated packet based on the identification,
wherein the transmission packet is received on at least two TTIs.

2. The terminal of claim 1, wherein the transmission packet is received from the base station based on a multimedia broadcast multicast service (MBMS).

3. The terminal of claim 1, wherein the small packet includes voice packets.

4. The terminal of claim 1, wherein the transmission packet is generated by duplication and the small packet is duplicated based on a channel state.

5. The terminal of claim 1, wherein an interval between the at least two TTIs is configured to a predetermined value.

6. A method performed by a terminal in a communication system, the method comprising:
   receiving, from a base station, a transmission packet that is generated based on a small packet having a size less than a data packet size corresponding to a transmission time interval (TTI);
   identifying a duplicated packet included in the transmission packet; and
   discarding the duplicated packet based on the identification,
   wherein the transmission packet is received on at least two TTIs.

7. The method of claim 6, wherein the transmission packet is received from the base station based on a multimedia broadcast multicast service (MBMS).

8. The method of claim 6, wherein the small packet includes voice packets.

9. The method of claim 6, wherein the small packet is duplicated based on a channel state.

10. The method of claim 6, wherein an interval between the at least two TTIs is configured to a predetermined value.

11. A broadcasting server in a communication system, the broadcasting server comprising:
    a transceiver; and
    at least one processor configured to:
        identify a small data packet based on data packets, the small data packet having a size less than a data packet size corresponding to a transmission time interval (TTI),
        generate a transmission packet by duplicating the small data packet to be transmitted on at least two TTIs, and
        transmit, via the transceiver, the transmission packet toward a terminal, a duplicated packet included in the transmission packet being discarded based on the transmission packet.

12. The broadcasting server of claim 11,
    wherein the transmission packet is transmitted to the terminal based on a multimedia broadcast multicast service (MBMS).

13. The broadcasting server of claim 11, wherein the small data packet includes voice packets.

14. The broadcasting server of claim 11, wherein the small data packet is duplicated based on a channel state.

15. A base station in a communication system, the base station comprising:
    a transceiver; and
    at least one processor configured to:
        identify a small data packet based on data packets, the small data packet having a size less than a data packet size corresponding to a transmission time interval (TTI),
        generate a transmission packet by duplicating the small data packet to be transmitted on at least two TTIs, and
        transmit, via the transceiver to a terminal, the transmission packet on the at least two TTIs, a duplicated packet included in the transmission packet being discarded based on the transmission packet.

16. The base station of claim 15,
    wherein the transmission packet is transmitted to the terminal based on a multimedia broadcast multicast service (MBMS).

17. The base station of claim 15, wherein the small data packet includes voice packets.

18. The base station of claim 15, wherein the small data packet is duplicated based on a channel state.

* * * * *